United States Patent
Littich et al.

(10) Patent No.: US 10,858,573 B2
(45) Date of Patent: Dec. 8, 2020

(54) OLEFINIC ESTER COMPOSITIONS AND THEIR USE AS CLEANING AGENTS

(71) Applicant: Elevance Renewable Sciences, Inc., Woodridge, IL (US)

(72) Inventors: Ryan Littich, Woodridge, IL (US); Georgeta Hategan, Woodridge, IL (US); Bruce Firth, Woodridge, IL (US); Dhananjay Puranik, Woodridge, IL (US); Steven Block, Woodridge, IL (US); Andrew Corr, Woodridge, IL (US); Garrett Zopp, Woodridge, IL (US); Alexander Ilseman, Woodridge, IL (US)

(73) Assignee: Wilmar Trading Pte Ltd, Singapore (SG)

( * ) Notice: Subject to any disclaimer, the term of this patent is extended or adjusted under 35 U.S.C. 154(b) by 143 days.

(21) Appl. No.: 14/596,044

(22) Filed: Jan. 13, 2015

(65) Prior Publication Data

US 2015/0197711 A1 Jul. 16, 2015

Related U.S. Application Data

(60) Provisional application No. 61/928,290, filed on Jan. 16, 2014, provisional application No. 62/006,655, (Continued)

(51) Int. Cl.
*C11D 1/00* (2006.01)
*C11D 3/20* (2006.01)
(Continued)

(52) U.S. Cl.
CPC ............ *C09K 8/524* (2013.01); *C11D 3/2093* (2013.01); *C11D 3/43* (2013.01); *C11D 7/5022* (2013.01)

(58) Field of Classification Search
CPC ......... C11D 1/00; C11D 3/2093; C11D 7/266; B08B 3/04
See application file for complete search history.

(56) References Cited

U.S. PATENT DOCUMENTS 4,934,391 A 6/1990 Futch et al.
5,120,371 A 6/1992 Bolden et al.
(Continued)

FOREIGN PATENT DOCUMENTS

CN 103305357 9/2013
EP 0971012 1/2000
(Continued)

OTHER PUBLICATIONS

International Search Report, PCT App. No. PCT/US2015/011224, dated Apr. 29, 2015.

*Primary Examiner* — Brian P Mruk
(74) *Attorney, Agent, or Firm* — Kilpatrick Townsend & Stockton LLP

(57) ABSTRACT

Compositions including olefinic ester compounds are generally disclosed. In some embodiments, such compositions are cleaning compositions, and can be used to clean various surfaces (e.g., hard surfaces, etc.) and/or materials (e.g., textiles, fibers, etc.). In some embodiments, the olefinic ester compounds are derived from a natural oil or a natural oil derivative, for example, by catalytic olefin metathesis.

8 Claims, 1 Drawing Sheet

Related U.S. Application Data filed on Jun. 2, 2014, provisional application No. 62/075,055, filed on Nov. 4, 2014, provisional application No. 62/081,933, filed on Nov. 19, 2014, provisional application No. 62/089,665, filed on Dec. 9, 2014.

(51) Int. Cl.

| | | |
|---|---|---|
| *C11D 7/26* | (2006.01) | |
| *B08B 3/04* | (2006.01) | |
| *C09K 8/524* | (2006.01) | |
| *C11D 3/43* | (2006.01) | |
| *C11D 7/50* | (2006.01) | |

(56) References Cited

U.S. PATENT DOCUMENTS

| | | | |
|---|---|---|---|
| 5,143,639 A | 9/1992 | Krawack | |
| 5,340,407 A | 8/1994 | Bolden et al. | |
| 5,340,495 A | 8/1994 | Mulcahy et al. | |
| 5,380,453 A | 1/1995 | Krawack | |
| 5,693,600 A | 12/1997 | Hendriksen et al. | |
| 5,849,106 A | 12/1998 | Bolden et al. | |
| 5,877,133 A | 3/1999 | Good | |
| 5,985,812 A | 11/1999 | Ehrenkrona | |
| 5,985,816 A | 11/1999 | Vlasblom | |
| 6,090,769 A | 7/2000 | Vlasblom | |
| 6,096,699 A | 8/2000 | Bergemann et al. | |
| 6,173,776 B1 | 1/2001 | Furman et al. | |
| 6,191,087 B1 | 2/2001 | Opre et al. | |
| 6,260,620 B1 | 7/2001 | Furman et al. | |
| 6,260,621 B1 | 7/2001 | Furman et al. | |
| 6,281,189 B1 | 8/2001 | Heimann et al. | |
| 6,284,720 B1 | 9/2001 | Opre | |
| 6,368,422 B1 | 4/2002 | Breuer et al. | |
| 6,630,428 B1 | 10/2003 | Furman et al. | |
| 6,776,234 B2 | 8/2004 | Boudreau | |
| 6,784,147 B1 | 8/2004 | Smith et al. | |
| 6,821,937 B2 | 11/2004 | Gross | |
| 6,824,623 B1 | 11/2004 | Gross et al. | |
| 7,192,912 B2 | 3/2007 | Laux | |
| 7,231,976 B2 | 6/2007 | Berry et al. | |
| 7,271,136 B2 | 9/2007 | Britton | |
| 7,312,184 B2 | 12/2007 | Boudreau | |
| 7,380,606 B2 | 6/2008 | Pursley et al. | |
| 7,392,844 B2 | 7/2008 | Berry et al. | |
| 7,449,437 B2 | 11/2008 | Gross et al. | |
| 7,462,206 B2 | 12/2008 | Notari et al. | |
| 7,547,672 B2 | 6/2009 | Zaki | |
| 7,588,646 B2 | 9/2009 | Sherrel et al. | |
| 7,666,264 B2 | 2/2010 | Britton | |
| 7,740,710 B2 | 6/2010 | Notari et al. | |
| 7,846,267 B2 | 12/2010 | Sherrel et al. | |
| 8,063,004 B2 | 11/2011 | Goldman | |
| 8,299,008 B2 | 10/2012 | Lallier | |
| 8,394,751 B2 | 3/2013 | Hawes, III et al. | |
| 8,695,267 B2 | 4/2014 | Li et al. | |
| 8,763,724 B2 | 7/2014 | Muller et al. | |
| 2002/0010114 A1 | 1/2002 | Dufay et al. | |
| 2004/0072718 A1 | 4/2004 | Kistenmacher et al. | |
| 2007/0155644 A1 | 7/2007 | Muse | |
| 2007/0227400 A1 | 10/2007 | Zullo et al. | |
| 2008/0033026 A1* | 2/2008 | Zullo | A01N 37/06 514/373 |
| 2013/0105738 A1 | 5/2013 | Essayem et al. | |
| 2013/0244913 A1 | 9/2013 | Maberry et al. | |
| 2013/0281688 A1* | 10/2013 | Di Biase | C07H 1/00 536/124 |
| 2014/0012023 A1* | 1/2014 | Thompson et al. | 554/122 |
| 2014/0171677 A1* | 6/2014 | Bertin et al. | 560/205 |

FOREIGN PATENT DOCUMENTS

| | | | |
|---|---|---|---|
| EP | 2175010 | 4/2010 | |
| EP | 2368971 | 9/2011 | |
| EP | 2428556 | 3/2012 | |
| FR | 2816965 | 5/2002 | |
| FR | 2935984 | 3/2010 | |
| GB | 2458019 | 4/2009 | |
| WO | 03/093215 | 11/2003 | |
| WO | 2007/062497 | 6/2007 | |
| WO | 2011/008289 | 1/2011 | |
| WO | WO 2012/061092 * | 5/2012 | C10L 1/18 |
| WO | 2013/162926 | 10/2013 | |
| WO | 2014/122411 | 8/2014 | |

\* cited by examiner

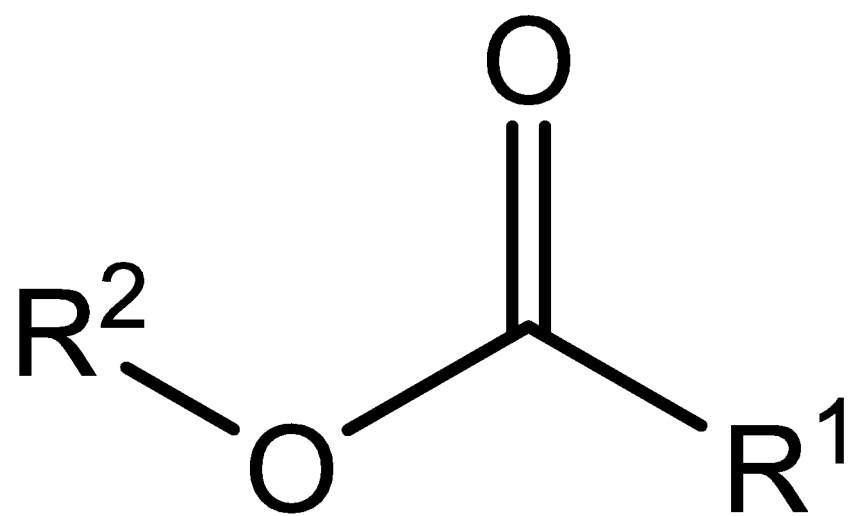

OLEFINIC ESTER COMPOSITIONS AND THEIR USE AS CLEANING AGENTS

CROSS-REFERENCE TO RELATED APPLICATIONS

The present application claims the benefit of priority of U.S. Provisional Application Nos. 61/928,290, filed Jan. 16, 2014; 62/006,655, filed Jun. 2, 2014; 62/075,055, filed Nov. 4, 2014; 62/081,933, filed Nov. 19, 2014; and 62/089,665, filed Dec. 9, 2014. Each of the foregoing applications is hereby incorporated by reference as though fully set forth herein in its entirety.

TECHNICAL FIELD

Compositions including olefinic ester compounds are generally disclosed. In some embodiments, such compositions are cleaning compositions, and can be used to clean various surfaces (e.g., hard surfaces, etc.) and/or materials (e.g., textiles, fibers, etc.). In some embodiments, the olefinic ester compounds are derived from a natural oil or a natural oil derivative, for example, by catalytic olefin metathesis.

BACKGROUND

The use of certain industrial solvents has curtailed in recent years due, in part, to concerns over their impact on the environment and their effects on general health and safety. This is especially true of solvents known to have a high volatile organic content (VOC), as such compounds may contribute to greenhouse gas production and ozone depletion. In some instances, traditional high VOC solvents can also be carcinogenic, teratogenic, toxic, and/or mutagenic. Therefore, a number of common solvents have come under increased regulatory scrutiny and therefore suffer from decreased use. Such solvents include aromatics (e.g., benzene, toluene, xylenes, and the like), ketones (e.g., methyl ethyl ketone, methyl isobutyl ketone, and the like), halogenated organics (e.g., dichloromethane, perchloroethylene, and the like), glycol ethers, and alcohols (e.g., methanol, isopropanol, ethylene glycol, and the like).

Certain derivatives of renewable feedstocks can provide more suitable alternatives to high VOC solvents. For example, fatty acid alkyl esters (e.g., from the transesterification of vegetable oils, animal fats, or other lipids) can provide environmentally friendly alternatives to traditional oxygenated solvents. Methyl soyate, for example, has a low VOC value, a high flash point, a low toxicity, and a high biodegradability. Terpene oils from citrus and pine (d-limonene and pinene, respectively) may also serve as suitable alternatives to certain traditional organic solvents.

Such renewable solvents are not without their problems, however. For example, d-limonene and dipentene (a racemate of d-limonene) are both acute and chronic aquatic toxins, and also have an irritating and sensitizing effect on the skin. Further, d-limonene is highly inflammable (e.g., more so than petroleum distillates) and can be subject to fluctuations in supply and price. Fatty acid alkyl esters can overcome some of these deficiencies of terpene oils, but can also exhibit poor solvency relative to certain incumbents.

Thus, there is a continuing need to develop solvent compounds and compositions that are renewably sourced, exhibit high solvency, and have a desirable health and safety profile (e.g., in terms of toxicity and VOCs).

SUMMARY

In a first aspect, the disclosure provides compositions that include olefinic ester compounds, wherein the olefinic ester compounds are esters of $C_{10-18}$ carboxylic acids having one or more carbon-carbon double bonds. In some embodiments, the esters are $C_{1-6}$ alkanol esters, such methyl esters, ethyl esters, isopropyl esters, and the like. Further, in some embodiments, the $C_{10-18}$ carboxylic acids are $C_{10-12}$ carboxylic acids having one to three carbon-carbon double bonds. In some embodiments, the compositions consist essentially of or consist of said olefinic ester compounds.

In some embodiments, the compositions are cleaning compositions, such as compositions suitable for use in cleaning various hard surfaces. In some other embodiments, the compositions are textile cleaning compositions, such as a textile pretreatment compositions or laundry detergent compositions. In some other embodiments, the compositions are useful for cleaning food or food-containing materials from various surfaces, such as the surfaces of various parts of industrial cooking equipment.

In a second aspect, the disclosure provides methods for cleaning a surface, including: contacting a surface with an amount (e.g., a cleaning effective amount) of the composition of any embodiment of the first aspect. In some embodiments, the surface is a hard surface. In some embodiments, the method comprises degreasing a surface, such as the surface of manufacturing equipment or the surface of food preparation equipment.

In a third aspect, the disclosure provides methods for cleaning a textile article, including: contacting a textile article with (e.g., an effective amount) of the composition of any embodiment of the first aspect. In some embodiments, the treating is part of a pretreatment regimen, where the textile is subsequently further cleaned using a laundry detergent or a dry-cleaning formulation, where the composition is contacted at a location having a stain disposed thereon or proximate to a location having a stain disposed thereon.

In a fourth aspect, the disclosure provides methods for cleaning food or food-containing compositions from a surface, including: providing a surface having food or a food-containing composition disposed thereon; and contacting the surface with an amount (e.g., a cleaning effective amount) of the composition of any embodiment of the first aspect to the surface, e.g., proximate to the food or food-containing composition.

Further aspects and embodiments are provided in the foregoing drawings, detailed description and claims.

BRIEF DESCRIPTION OF THE DRAWINGS

The following drawings are provided for purposes of illustrating various embodiments of the compositions and methods disclosed herein. The drawings are provided for illustrative purposes only, and are not intended to describe any preferred compositions or preferred methods, or to serve as a source of any limitations on the scope of the claimed inventions.

FIG. 1 shows an example of an olefinic ester compound of certain embodiments disclosed herein, where $R^1$ is a $C_{9-17}$ alkenyl group and $R^2$ is a $C_{1-6}$ alkyl group.

DETAILED DESCRIPTION

The following description recites various aspects and embodiments of the compositions and methods disclosed herein. No particular embodiment is intended to define the scope of the invention. Rather, the embodiments provide non-limiting examples of various compositions and methods. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

As used herein, "natural oil," "natural feedstock," or "natural oil feedstock" refer to oils derived from plants or animal sources. These terms include natural oil derivatives, unless otherwise indicated. The terms also include modified plant or animal sources (e.g., genetically modified plant or animal sources), unless indicated otherwise. Examples of natural oils include, but are not limited to, vegetable oils, algae oils, fish oils, animal fats, tall oils, derivatives of these oils, combinations of any of these oils, and the like. Representative non-limiting examples of vegetable oils include rapeseed oil (canola oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil feedstock comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil feedstock.

As used herein, "natural oil derivatives" refers to the compounds or mixtures of compounds derived from a natural oil using any one or combination of methods known in the art. Such methods include but are not limited to saponification, fat splitting, transesterification, esterification, hydrogenation (partial, selective, or full), isomerization, oxidation, and reduction. Representative non-limiting examples of natural oil derivatives include gums, phospholipids, soapstock, acidulated soapstock, distillate or distillate sludge, fatty acids and fatty acid alkyl ester (e.g. non-limiting examples such as 2-ethylhexyl ester), hydroxy substituted variations thereof of the natural oil. For example, the natural oil derivative may be a fatty acid methyl ester ("FAME") derived from the glyceride of the natural oil. In some embodiments, a feedstock includes canola or soybean oil, as a non-limiting example, refined, bleached, and deodorized soybean oil (i.e., RBD soybean oil). Soybean oil typically comprises about 95% weight or greater (e.g., 99% weight or greater) triglycerides of fatty acids. Major fatty acids in the polyol esters of soybean oil include saturated fatty acids, as a non-limiting example, palmitic acid (hexadecanoic acid) and stearic acid (octadecanoic acid), and unsaturated fatty acids, as a non-limiting example, oleic acid (9-octadecenoic acid), linoleic acid (9,12-octadecadienoic acid), and linolenic acid (9,12,15-octadecatrienoic acid).

As used herein, "metathesis catalyst" includes any catalyst or catalyst system that catalyzes an olefin metathesis reaction.

As used herein, "metathesize" or "metathesizing" refer to the reacting of a feedstock in the presence of a metathesis catalyst to form a "metathesized product" comprising new olefinic compounds, i.e., "metathesized" compounds. Metathesizing is not limited to any particular type of olefin metathesis, and may refer to cross-metathesis (i.e., co-metathesis), self-metathesis, ring-opening metathesis, ring-opening metathesis polymerizations ("ROMP"), ring-closing metathesis ("RCM"), and acyclic diene metathesis ("ADMET"). In some embodiments, metathesizing refers to reacting two triglycerides present in a natural feedstock (self-metathesis) in the presence of a metathesis catalyst, wherein each triglyceride has an unsaturated carbon-carbon double bond, thereby forming a new mixture of olefins and esters which may include a triglyceride dimer. Such triglyceride dimers may have more than one olefinic bond, thus higher oligomers also may form. Additionally, in some other embodiments, metathesizing may refer to reacting an olefin, such as ethylene, and a triglyceride in a natural feedstock having at least one unsaturated carbon-carbon double bond, thereby forming new olefinic molecules as well as new ester molecules (cross-metathesis).

As used herein, "hydrocarbon" refers to an organic group composed of carbon and hydrogen, which can be saturated or unsaturated, and can include aromatic groups. The term "hydrocarbyl" refers to a monovalent or polyvalent hydrocarbon moiety.

As used herein, "olefin" or "olefins" refer to compounds having at least one unsaturated carbon-carbon double bond. In certain embodiments, the term "olefins" refers to a group of unsaturated carbon-carbon double bond compounds with different carbon lengths. Unless noted otherwise, the terms "olefin" or "olefins" encompasses "polyunsaturated olefins" or "poly-olefins," which have more than one carbon-carbon double bond. As used herein, the term "monounsaturated olefins" or "mono-olefins" refers to compounds having only one carbon-carbon double bond. A compound having a terminal carbon-carbon double bond can be referred to as a "terminal olefin" or an "alpha-olefin," while an olefin having a non-terminal carbon-carbon double bond can be referred to as an "internal olefin." In some embodiments, the alpha-olefin is a terminal alkene, which is an alkene (as defined below) having a terminal carbon-carbon double bond. Additional carbon-carbon double bonds can be present.

The number of carbon atoms in any group or compound can be represented by the terms: "$C_z$", which refers to a group of compound having z carbon atoms; and "$C_{x-y}$", which refers to a group or compound containing from x to y, inclusive, carbon atoms. For example, "$C_{1-6}$ alkyl" represents an alkyl chain having from 1 to 6 carbon atoms and, for example, includes, but is not limited to, methyl, ethyl, n-propyl, isopropyl, isobutyl, n-butyl, sec-butyl, tert-butyl, isopentyl, n-pentyl, neopentyl, and n-hexyl. As a further example, a "$C_{4-10}$ alkene" refers to an alkene molecule having from 4 to 10 carbon atoms, and, for example, includes, but is not limited to, 1-butene, 2-butene, isobutene, 1-pentene, 1-hexene, 3-hexene, 1-heptene, 3-heptene, 1-octene, 4-octene, 1-nonene, 4-nonene, and 1-decene.

As used herein, the term "low-molecular-weight olefin" may refer to any one or combination of unsaturated straight, branched, or cyclic hydrocarbons in the $C_{2-14}$ range. Low-molecular-weight olefins include alpha-olefins, wherein the unsaturated carbon-carbon bond is present at one end of the compound. Low-molecular-weight olefins may also include dienes or trienes. Low-molecular-weight olefins may also include internal olefins or "low-molecular-weight internal olefins." In certain embodiments, the low-molecular-weight internal olefin is in the $C_{4-14}$ range. Examples of low-molecular-weight olefins in the $C_{2-6}$ range include, but are not limited to: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1,4-pentadiene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. Non-limiting examples of low-molecular-weight olefins in the $C_{7-9}$ range include 1,4-heptadiene, 1-heptene, 3,6-nonadiene, 3-nonene, 1,4,7-octatriene. Other possible low-molecular-weight olefins include styrene and vinyl cyclohexane. In certain embodiments, it is preferable to use a mixture of olefins, the mixture comprising linear and branched low-molecular-weight olefins in the $C_{4-10}$ range. Olefins in the $C_{4-10}$ range can also be referred to as "short-chain olefins," which can be either branched or unbranched. In one embodiments, it may be preferable to use a mixture of linear and branched $C_4$ olefins (i.e., combinations of: 1-butene, 2-butene, and/or isobutene). In other embodiments, a higher range of $C_{11-14}$ may be used.

In some instances, the olefin can be an "alkene," which refers to a straight- or branched-chain non-aromatic hydrocarbon having 2 to 30 carbon atoms and one or more carbon-carbon double bonds, which may be optionally substituted, as herein further described, with multiple degrees of substitution being allowed. A "monounsaturated alkene" refers to an alkene having one carbon-carbon double bond, while a "polyunsaturated alkene" refers to an alkene having two or more carbon-carbon double bonds. A "lower alkene," as used herein, refers to an alkene having from 2 to 10 carbon atoms.

As used herein, "ester" or "esters" refer to compounds having the general formula: R—COO—R', wherein R and R' denote any organic group (such as alkyl, aryl, or silyl groups) including those bearing heteroatom-containing substituent groups. In certain embodiments, R and R' denote alkyl, alkenyl, aryl, or alcohol groups. In certain embodiments, the term "esters" may refer to a group of compounds with the general formula described above, wherein the compounds have different carbon lengths. In certain embodiments, the esters may be esters of glycerol, which is a trihydric alcohol. The term "glyceride" can refer to esters where one, two, or three of the —OH groups of the glycerol have been esterified.

It is noted that an olefin may also comprise an ester, and an ester may also comprise an olefin, if the R or R' group in the general formula R—COO—R' contains an unsaturated carbon-carbon double bond. Such compounds can be referred to as "unsaturated esters" or "olefin ester" or "olefinic ester compounds." Further, a "terminal olefinic ester compound" may refer to an ester compound where R has an olefin positioned at the end of the chain. An "internal olefin ester" may refer to an ester compound where R has an olefin positioned at an internal location on the chain. Additionally, the term "terminal olefin" may refer to an ester or an acid thereof where R' denotes hydrogen or any organic compound (such as an alkyl, aryl, or silyl group) and R has an olefin positioned at the end of the chain, and the term "internal olefin" may refer to an ester or an acid thereof where R' denotes hydrogen or any organic compound (such as an alkyl, aryl, or silyl group) and R has an olefin positioned at an internal location on the chain.

As used herein, "acid," "acids," "carboxylic acid," or "carboxylic acids" refer to compounds having the general formula: R—COOH, wherein R denotes any organic moiety (such as alkyl, aryl, or silyl groups), including those bearing heteroatom-containing substituent groups. In certain embodiments, R denotes alkyl, alkenyl, aryl, or alcohol groups. In certain embodiments, the term "acids" or "carboxylic acids" may refer to a group of compounds with the general formula described above, wherein the compounds have different carbon lengths.

As used herein, "alcohol" or "alcohols" refer to compounds having the general formula: R—OH, wherein R denotes any organic moiety (such as alkyl, aryl, or silyl groups), including those bearing heteroatom-containing substituent groups. In certain embodiments, R denotes alkyl, alkenyl, aryl, or alcohol groups. In certain embodiments, the term "alcohol" or "alcohols" may refer to a group of compounds with the general formula described above, wherein the compounds have different carbon lengths. As used herein, the term "alkanol" refers to alcohols where R is an alkyl group.

As used herein, "alkyl" refers to a straight or branched chain saturated hydrocarbon having 1 to 30 carbon atoms, which may be optionally substituted, as herein further described, with multiple degrees of substitution being allowed. Examples of "alkyl," as used herein, include, but are not limited to, methyl, ethyl, n-propyl, isopropyl, isobutyl, n-butyl, sec-butyl, tert-butyl, isopentyl, n-pentyl, neopentyl, n-hexyl, and 2-ethylhexyl. In some instances, the "alkyl" group can be divalent, in which case the group can alternatively be referred to as an "alkylene" group.

As used herein, "alkenyl" refers to a straight or branched chain non-aromatic hydrocarbon having 2 to 30 carbon atoms and having one or more carbon-carbon double bonds, which may be optionally substituted, as herein further described, with multiple degrees of substitution being allowed. Examples of "alkenyl," as used herein, include, but are not limited to, ethenyl, 2-propenyl, 2-butenyl, and 3-butenyl. In some instances, the "alkenyl" group can be divalent, in which case the group can alternatively be referred to as an "alkenylene" group.

As used herein, "halogen" or "halo" refers to a fluorine, chlorine, bromine, and/or iodine atom. In some embodiments, the terms refer to fluorine and/or chlorine.

As used herein, "substituted" refers to substitution of one or more hydrogen atoms of the designated moiety with the named substituent or substituents, multiple degrees of substitution being allowed unless otherwise stated, provided that the substitution results in a stable or chemically feasible compound. A stable compound or chemically feasible compound is one in which the chemical structure is not substantially altered when kept at a temperature from about −80° C. to about +40° C., in the absence of moisture or other chemically reactive conditions, for at least a week. As used herein, the phrases "substituted with one or more . . . " or "substituted one or more times . . . " refer to a number of substituents that equals from one to the maximum number of substituents possible based on the number of available bonding sites, provided that the above conditions of stability and chemical feasibility are met.

As used herein, "yield" refers to the amount of reaction product formed in a reaction. When expressed with units of percent (%), the term yield refers to the amount of reaction product actually formed, as a percentage of the amount of reaction product that would be formed if all of the limiting reactant were converted into the product.

As used herein, "mix" or "mixed" or "mixture" refers broadly to any combining of two or more compositions. The two or more compositions need not have the same physical state; thus, solids can be "mixed" with liquids, e.g., to form a slurry, suspension, or solution. Further, these terms do not require any degree of homogeneity or uniformity of composition. This, such "mixtures" can be homogeneous or heterogeneous, or can be uniform or non-uniform. Further, the terms do not require the use of any particular equipment to carry out the mixing, such as an industrial mixer.

As used herein, "optionally" means that the subsequently described event(s) may or may not occur. In some embodiments, the optional event does not occur. In some other embodiments, the optional event does occur one or more times.

As used herein, "comprise" or "comprises" or "comprising" or "comprised of" refer to groups that are open, meaning that the group can include additional members in addition to those expressly recited. For example, the phrase, "comprises A" means that A must be present, but that other members can be present too. The terms "include," "have," and "composed of" and their grammatical variants have the same meaning. In contrast, "consist of" or "consists of" or "consisting of" refer to groups that are closed. For example, the phrase "consists of A" means that A and only A is present.

As used herein, "or" is to be given its broadest reasonable interpretation, and is not to be limited to an either/or construction. Thus, the phrase "comprising A or B" means that A can be present and not B, or that B is present and not A, or that A and B are both present. Further, if A, for example, defines a class that can have multiple members, e.g., $A_1$ and $A_2$, then one or more members of the class can be present concurrently.

As used herein, the various functional groups represented will be understood to have a point of attachment at the functional group having the hyphen or dash (—) or an asterisk (*). In other words, in the case of —CH$_2$CH$_2$CH$_3$, it will be understood that the point of attachment is the CH$_2$ group at the far left. If a group is recited without an asterisk or a dash, then the attachment point is indicated by the plain and ordinary meaning of the recited group.

As used herein, multi-atom bivalent species are to be read from left to right. For example, if the specification or claims recite A-D-E and D is defined as —OC(O)—, the resulting group with D replaced is: A-OC(O)-E and not A-C(O)O-E.

Other terms are defined in other portions of this description, even though not included in this subsection.

Compositions Including Olefinic Ester Compounds

In certain aspects, the disclosure provides compositions that include olefinic ester compounds. Any suitable olefin ester compounds can be used in the compositions. In some embodiments, the olefinic ester compounds are alkanol esters, e.g., $C_{1-6}$ alkanol esters, of $C_{10-18}$ carboxylic acids having at least one carbon-carbon double bond.

Suitable alkanols include, but are not limited to, methanol, ethanol, propanol, isopropanol, butanol, isobutanol, tert-butyl alcohol, pentanol, isoamyl alcohol, neopentyl alcohol, and hexanol. In some embodiments, the alkanol is methanol, ethanol, or isopropanol. In some embodiments, the alkanol is methanol or ethanol. In some embodiments, the alkanol is methanol. Any suitable $C_{10-18}$ carboxylic acid can be employed in such esters, including branched and unbranched carboxylic acids.

In some such embodiments, the olefinic ester compounds are alkanol esters of $C_{10-16}$ carboxylic acids having one to three carbon-carbon double bonds, or alkanol esters of $C_{10-15}$ carboxylic acids having one to three carbon-carbon double bonds, or alkanol esters of $C_{10-14}$ carboxylic acids having one to three carbon-carbon double bonds, or alkanol esters of $C_{10-12}$ carboxylic acids having one to three carbon-carbon double bonds, or alkanol esters of $C_{12-18}$ carboxylic acids having one to three carbon-carbon double bonds, or alkanol esters of $C_{12-16}$ carboxylic acids having one to three carbon-carbon double bonds, or alkanol esters of $C_{12-15}$ carboxylic acids having one to three carbon-carbon double bonds, or alkanol esters of $C_{12-14}$ carboxylic acids having one to three carbon-carbon double bonds. Any alkanols of the aforementioned embodiments can be used. In some embodiments, where the carboxylic acid has two or three carbon-carbon double bonds, none of the carbon-carbon double bands are conjugated, either to each other or to other unsaturation in the compound. In some other embodiments, the carboxylic acid group has a single carbon-carbon double bond. In some embodiments, the carboxylic acid is 9-decenoic acid, 9-undecenoic acid, or 9-dodecenoic acid.

In some embodiments, the olefinic ester compounds are methyl 9-decenoate, methyl 9-undenenoate, methyl 9-dodecenoate, or a mixture thereof. In some embodiments, the olefinic ester compounds are methyl 9-decenoate, methyl 9-dodecenoate, or a mixture thereof. In some other embodiments, the olefinic ester compounds are methyl 9-decenoate. In some other embodiments, the olefinic ester compounds are methyl 9-dodecenoate.

In some embodiments, the olefinic ester compounds are one or more compounds of formula (I):

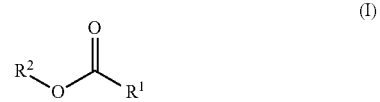

wherein:
$R^1$ is $C_{9-17}$ alkenyl; and
$R^2$ is $C_{1-6}$ alkyl.

In some embodiments, $R^1$ is $C_{9-15}$ alkenyl. In some embodiments, $R^1$ is $C_{9-14}$ alkenyl. In some embodiments, $R^1$ is $C_{9-13}$ alkenyl. In some embodiments, $R^1$ is $C_{9-11}$ alkenyl. In some embodiments, $R^1$ is $C_{11-15}$ alkenyl. In some embodiments, $R^1$ is $C_{11-14}$ alkenyl. In some embodiments, $R^1$ is $C_{11-13}$ alkenyl. In some embodiments, $R^1$ is $C_9$ alkenyl or $C_{11}$ alkenyl. In some embodiments, $R^1$ is $C_9$ alkenyl. In some embodiments, $R^1$ is $C_{11}$ alkenyl. In some such embodiments, $R^1$ has one to three carbon-carbon double bonds, which, when multiple carbon-carbon double bonds are present, in some embodiments, are not conjugated. In some embodiments, $R^1$ has a single carbon-carbon-double bond. In some other embodiments, $R^1$ has two non-conjugated double bonds. In some other embodiments, $R^1$ has two or three conjugated double bonds, such as a $C_{13-15}$ alkenyl having two or three conjugated carbon-carbon double bonds. In some embodiments, $R^1$ is —$(CH_2)_7$—CH=CH$_2$, —$(CH_2)_7$—CH=CH—CH$_3$, or —$(CH_2)_7$—CH=CH—CH$_2$—CH$_3$. In some embodiments, $R^1$ is —$(CH_2)_7$—CH=CH$_2$ or —$(CH_2)_7$—CH=CH—CH$_2$—CH$_3$. In some embodiments, $R^1$ is —$(CH_2)_7$—CH=CH$_2$. In some embodiments, $R^1$ is —$(CH_2)_7$—CH=CH—CH$_2$—CH$_3$.

In some embodiments, $R^2$ is methyl, ethyl, isopropyl, propyl, butyl, isobutyl, sec-butyl, tert-butyl, pentyl, isoamyl, neopentyl, or hexyl. In some embodiments, $R^2$ is methyl, ethyl, isopropyl, propyl, butyl, isobutyl, sec-butyl, or tert-butyl. In some embodiments, $R^2$ is methyl, ethyl, or isopropyl. In some embodiments, $R^2$ is methyl or ethyl. In some embodiments, $R^2$ is methyl.

In some embodiments, the compositions disclosed herein consist of the olefinic ester compounds, meaning that the compositions contain no other materials besides the olefinic ester compounds. In some embodiments, the compositions disclosed herein consist essentially of the olefinic ester compounds, meaning that the compositions can contain one or more other materials that do not materially affect the basic characteristics of the olefinic ester composition or its use. In some embodiments, the compositions disclosed herein can comprise (or include) other materials, including materials that can affect the basic characteristics of the olefinic ester composition or its use.

The olefinic ester compounds can make up any suitable amount of the disclosed compositions. In some embodiments, the olefinic ester compounds make up at least 50 percent by weight, or at least 60 percent by weight, or at least 70 percent by weight, or at least 80 percent by weight, or at least 90 percent by weight, or at least 95 percent by weight of the composition, based on the total weight of the composition. In some such embodiments, the olefinic ester compounds make up no more than 99 percent by weight of the composition, based on the total weight of the composition. The compositions can include any other suitable component or combination of components. In some other embodiments, however, the olefinic ester compounds make up a lower amount of the composition. Thus, in some embodiments, the composition includes from 1 to 70 percent by weight, or from 2 to 70 percent by weight, or from 5 to 70 percent by weight, or from 10 to 70 percent by weight, or from 20 to 70 percent by weight, or from 30 to 70 percent by weight, or from 40 to 70 percent by weight, or from 1 to 50 percent by weight, or from 2 to 50 percent by weight, or from 5 to 50 percent by weight, or from 10 to 50 percent by weight, or from 20 to 50 percent by weight, or from 30 to 50 percent by weight, or from 1 to 30 percent by weight, or from 2 to 30 percent by weight, or from 5 to 30 percent by weight, or from 10 to 30 percent by weight, or from 1 to 20 percent by weight, or from 2 to 20 percent by weight, or from 5 to 20 percent by weight, based on the total weight of the composition.

In some embodiments, the compositions include one or more surfactants (according to any of the embodiments described below), such as non-ionic surfactants, anionic surfactants, or cationic surfactants. In some such embodiments, the compositions include one or more non-ionic surfactants. In some such embodiments, the compositions include one or more anionic surfactants. In some such embodiments, the compositions include one or more cationic surfactants.

In some embodiments, the olefinic ester compounds may make up a smaller portion of the composition. For example, in some embodiments, the olefinic ester compounds make up at least 1 percent by weight up to 10 percent by weight, or up to 20 percent by weight, or up to 30 percent by weight, or up to 40 percent by weight, or up to 50 percent by weight, of the composition, based on the total weight of the composition.

In some such embodiments, the composition further comprises saturated ester compounds. For example, in some such embodiments, the saturated ester compounds make up at least 30 percent by weight, or at least 40 percent by weight, up to 60 percent by weight, or up to 70 percent by weight, or up to 80 percent by weight, or up to 90 percent by weight, or up to 95 percent by weight, of the composition, based on the total weight of the composition. As another example, the weight-to-weight ratio of saturated ester compounds to olefinic ester compounds in the composition ranges from 1:10 to 10:1, or from 1:5 to 5:1, or from 1:3 to 3:1, or from 1:2 to 2:1. Any suitable saturated fatty acid ester can be used, such as $C_{1-6}$ alkanolic esters of $C_{10-18}$ saturated fatty acids, such as $C_{1-6}$ alkanolic esters (e.g., methyl esters, ethyl esters, isopropyl esters, etc.) of capric acid, lauric acid, myristic acid, palmitic acid, stearic acid, and the like.

In some instances it may be suitable to deliver the composition as a component of an emulsion, such as an oil-in-water emulsion or a water-in-oil emulsion. In some embodiments, the olefinic ester compounds are part of an oily component (e.g., a primary solvent) of an emulsion, e.g., a microemulsion. In some such embodiments, the amount of primary solvent used in the emulsion is variable with the end use. For example, in the event that the microemulsion is used to remove an undesirable substance from a hard surface such as, for example, stripping paint from a painted surface or removing grease from the surface of a piece of industrial equipment, the amount of primary solvent can be higher, such as from 50 to 99 percent by weight, or from 60 to 99 percent by weight, or from 70 to 99 percent by weight, or from 80 to 99 percent by weight, or from 50 to 95 percent by weight, or from 60 to 95 percent by weight, or from 70 to 95 percent by weight, or from 80 to 95 percent by weight, based on the weight of the microemulsion. On the other hand, for example, if the microemulsion is used to remove an undesirable substance, such as undesirable paint or graffiti, from a coated surface, such as a painted wall or railroad boxcar, the amount of primary solvent may be lower, such as from 10 to 70 percent by weight, or from 10 to 60 percent by weight, or from 10 to 50 percent by weight, or from 25 to 70 percent by weight, or from 25 to 60 percent by weight, or from 25 to 50 percent by weight, based on the weight of the microemulsion.

In some embodiments, the relative amounts of the other components of the composition vary according to the end use of the composition and can be any amounts required to clean a particular undesirable substance from a particular surface. The amount of anionic surfactant, for example, can vary from 1 to 75 percent by weight, or from 2 to 60 percent by weight, or from 3 to 50 percent by weight, or from 5 to 40 percent by weight, or from 5 to 30 percent by weight, or from 5 to 20 percent by weight, or from 5 to 14 percent by weight, or from 5 to 13 percent by weight, based on the total weight of the composition (e.g., the undiluted, pre-emulsified composition). In some embodiments, such compositions are emulsified by mixing them with an aqueous medium to form an oil-in-water emulsion or a water-in-oil emulsion. Suitable emulsifiers can be added to assist in the emulsification. Any suitable degree of dilution can be used, depending on the intended end use, the desired concentration of solvent, and other ingredients.

Compositions comprising anionic surfactants can be used in a variety of cleaning applications. For example, in some embodiments, compositions comprising anionic surfactants are used for a variety of end uses. Suitable end uses include, but are not limited to, degreasing (e.g., from various surfaces), stain removal or treatment (e.g., on fabrics or other textiles), removal of food and food-containing materials, and general hard-surface cleaning. The desired end-use application may require use of different surfactants or combinations of surfactants, as well as different amounts of those surfactants.

In some embodiments, the compositions can include one or more additional ingredients or additives. Such additional ingredients or additives include, but are not limited to, carriers, solvents, co-solvents (such as longer-chain olefinic ester compounds), surfactants, co-surfactants, emulsifiers, natural or synthetic colorants, natural or synthetic fragrances, natural or synthetic deodorizers, antioxidants, corrosion inhibitors, chelating agents, precipitating and/or sequestering builders, and antimicrobial agents. These agents can be used in any suitable amounts, depending on the types of other ingredients in the composition (e.g., anionic surfactants, cationic surfactants, non-ionic surfactants, etc.), the amounts of other ingredients in the composition (e.g., amount of various surfactants), whether the composition is to be formulated as an emulsion, and, if so, what type of emulsion it will be (e.g., oil-in-water, water-in-oil, etc.), and what the desired range of end-uses will be.

In embodiments that include surfactants, any suitable surfactants can be used. For example, in some embodiments, the surfactants used in the composition can include surfactants having an HLB (hydrophile-lipophile balance) of 4 to 14, or 8 to 13. In some embodiments, the surfactants used in the composition include the amine salts (e.g., the isopropyl amine salt) of dodecylbenzene sulfonic acid, the amine salts (e.g., the isopropyl amine salt) of oleic acid, linear alcohol alkoxylates, branched alcohol alkoxylates, alkyl phenol alkoxylates, fatty amides, fatty alkanolamides, fatty amine alkoxylates, sorbitan esters, glycerol esters, and combinations thereof. Other examples of suitable nonionic surfactants include, but are not limited to, linear alcohol alkoxylates, branched alcohol alkoxylates, alkyl phenol alkoxylates, fatty amides, fatty alkanolamides, fatty amine alkoxylates, and combinations thereof. Some other examples of suitable anionic surfactants include, but are not limited to, water-soluble salts of alkyl benzene sulfonates, alkyl sulfates, alkyl polyalkoxy ether sulfates, paraffin sulfonates, alpha-olefin sulfonates and sulfosuccinates, alpha-sulfocarboxylates and their esters, alkyl glyceryl ether sulfonates, fatty acid monoglyceride sulfates and sulfonates, alkyl phenol polyalkoxyether sulfates and combinations thereof. Other examples of suitable anionic surfactants include, but are not limited to, the water-soluble salts or esters of alpha-sulfonated fatty acids containing from about 6 to about 20 carbon atoms in the fatty acid group and from about 1 to about 10 carbon atoms in the ester group.

In some embodiments, such cleaning compositions can have improved high- and low-temperature stability, in comparison to a cleaning composition not including such a surfactant.

Surfactants can also be added to the finished composition to alleviate potential customers of the need to select a surfactant that may be suitable for particular end uses.

Surfactant-containing compositions may also be useful in the preparation of emulsions (e.g., microemulsions or nanoemulsions), e.g., where the oily phase is emulsified in an aqueous medium, or vice versa. In such embodiments, the surfactants can include linear alcohol alkoxylates, branched alcohol alkoxylates, alkyl phenol alkoxylates, fatty amides, fatty alkanolamides, fatty amine alkoxylates and combinations thereof. In some such embodiments, the olefinic ester compound is the primary solvent.

In certain aspects and embodiments, such compositions can be used in a cleaning method, where the cleaning composition is applied to a surface (e.g., a surface to be cleaned). In some such embodiments, the surface can be washed with an aqueous medium (e.g., water) after application of the cleaning composition.

In some embodiments, nonionic surfactants having an HLB of from about 4 to about 14, or from 8 to 13, may be suitable in the preparation of a microemulsion. Non-limiting examples of such surfactants include, but are not limited to, linear alcohol alkoxylates, branched alcohol alkoxylates, alkyl phenol alkoxylates, fatty amides, fatty amide alkoxylates, fatty amine alkoxylates and combinations thereof.

In some embodiments, cationic surfactants can be used. Suitable cationic surfactants include, but are not limited to, water-soluble quaternary ammonium salts fatty amines, ammonium salts of fatty amines, quaternary ammonium salts of ethoxylated fatty amines, ammonium salts of ethoxylated fatty amines, quaternary ammonium salts of modified alkyl polyglucosides, and combinations thereof.

In some embodiments, the cleaning composition (e.g., a microemulsion) can include a nonionic and/or amphoteric surfactant. In some such embodiments, the olefinic ester compound is a primary solvent.

In some embodiments, nonionic surfactants and/or amphoteric surfactants can be used, e.g., nonionic surfactants having an HLB of from 4 to 14, or 8 to 13, e.g., in a microemulsion. Non-limiting examples of nonionic surfactants include, but are not limited to, linear alcohol alkoxylates, branched alcohol alkoxylates, alkyl phenol alkoxylates, fatty amides, fatty amide alkoxylates, fatty amine alkoxylates and combinations thereof. Non-limiting examples of amphoteric surfactants include, but are not limited to, water-soluble $C_{6-12}$ fatty amidoamine betaines, $C_{6-12}$ fatty amidoamine sultaines and hydroxysultaines, $C_{6-12}$ fatty amidoamine oxides, fatty iminodiproponiates, $C_{6-12}$ fatty amine betaines, $C_{6-12}$ fatty amines sultaines, $C_{6-12}$ fatty amine hydroxysultaines, $C_{6-12}$ fatty amine oxides, and combinations thereof.

In some embodiments, other surfactants can be used, either in combination with one or more of anionic, cationic and/or amphoteric surfactants (e.g., as short-chain co-surfactants) or alone. Non-limiting examples of such other surfactants include, but are not limited to, $C_{3-6}$ alcohols, glycols, glycol ethers, pyrrolidones, glycol ether esters, and combinations thereof.

In some embodiments, the relative amounts of the components of the composition will vary according to the end use of the composition and can be any amounts required to clean a particular undesirable substance from a particular surface. The amount of non-ionic surfactant, for example, can vary from 1 to 75 percent by weight, or from 2 to 60 percent by weight, or from 3 to 50 percent by weight, or from 5 to 40 percent by weight, or from 5 to 30 percent by weight, or from 5 to 20 percent by weight, based on the total weight of the composition (e.g., the undiluted, pre-emulsified composition). In some embodiments, such compositions are emulsified by mixing them with an aqueous medium to form an oil-in-water emulsion or a water-in-oil emulsion. Suitable emulsifiers can be added to assist in the emulsification. Any suitable degree of dilution can be used, depending on the intended end use, the desired concentration of solvent, and other ingredients.

Compositions comprising non-ionic surfactants can be used in a variety of applications. For example, in some embodiments, compositions comprising non-ionic surfactants are used for a variety of end uses. Suitable end uses include, but are not limited to, food cleaning (e.g., removal of oils and fatty materials from cooking equipment). In some such embodiments, the composition also includes anionic surfactants along with the non-ionic surfactants. The desired end-use application may require use of different surfactants or combinations of surfactants, as well as different amounts of those surfactants.

In some embodiments, the composition comprises water. In some such embodiments, the composition is an emulsion, meaning that the composition includes two or more phases where at least one of the phases is at least partially dispersed in one or more of the other phases. In some further such embodiments, the composition is a microemulsion or a nanoemulsion, meaning that at least one of the phases is dispersed as small droplets whose size is on the order of about 1 nm up to about 1 micron. In some embodiments, the droplet size is less than the wavelength of the lowest energy visible light, e.g., less than 350 nm, or less than 300 nm, or less than 250 nm, or less than 200 nm, or less than 150 nm, or less than 100 nm, down to about 50 nm.

In some other embodiments, the composition is substantially free of water. For example, in some embodiments, the composition includes less than 2 percent by weight, or less than 1 percent by weight, or less than 0.5 percent by weight, or less than 0.1 percent by weight water, based on the total weight of the composition.

In some embodiments, the composition also includes alkanol esters (e.g., methyl esters) of saturated carboxylic acids, referred to herein as "saturated ester compounds."

The composition can contain any suitable distribution of olefinic ester compounds. For example, in some embodiments, the composition includes at least 50 percent by weight, or at least 60 percent by weight, or at least 70 percent by weight, or at least 80 percent by weight alkanol esters (e.g., methyl esters) of $C_{10-12}$ carboxylic acids having one or more carbon-carbon double bonds, based on the total weight of olefinic ester compounds and saturated ester compounds in the composition. In some embodiments, said $C_{10-12}$ carboxylic acids have one carbon-carbon double bond. In some embodiments, the composition includes at least 50 percent by weight, or at least 60 percent by weight, or at least 70 percent by weight, or at least 75 percent by weight of methyl esters of 9-decenoic acid, 9-undecenoic acid, or 9-dodecenoic acid, based on the total weight of olefinic ester compounds and saturated ester compounds in the composition. In some embodiments, the composition includes at least 50 percent by weight, or at least 60 percent by weight, or at least 70 percent by weight, or at least 75 percent by weight of methyl esters of 9-decenoic acid or 9-dodecenoic acid, based on the total weight of olefinic ester compounds and saturated ester compounds in the composition. In some such embodiments, the composition includes no more than 20 percent by weight, or no more than 15 percent by weight, or no more than 10 percent by weight of saturated ester compounds, based on the total weight of olefinic ester compounds and saturated ester compounds. In some embodiments, the composition includes: (a) 20 to 50 percent by weight, or 30 to 40 percent by weight of $C_{10}$ olefinic ester compounds (e.g., methyl esters of 9-decenoic acid); (b) 30 to 60 percent by weight, or 40 to 50 percent by weight of $C_{12}$ olefinic ester compounds (e.g., methyl esters of 9-dodecenoic acid); and (c) 5 to 25 percent by weight, or 5 to 15 percent by weight of saturated ester compounds (e.g., methyl palmitate).

In some other embodiments, the composition includes at least 40 percent by weight, or at least 50 percent by weight, or at least 60 percent by weight, or at least 70 percent by weight, or at least 80 percent by weight, or at least 90 percent by weight, or at least 95 percent by weight, of $C_{12}$ olefinic ester compounds (e.g., alkanol esters of 9-dodecenoic acid), based on the total weight of the composition or the total weight of the oily phase of an oil-in-water emulsion (excluding emulsifiers). In some such embodiments, the composition includes 50 to 99 percent by weight, or 60 to 99 percent by weight, of $C_{12}$ olefinic ester compounds (e.g., alkanol esters of 9-dodecenoic acid), based on the total weight of the composition or the total weight of the oily phase of an oil-in-water emulsion (excluding emulsifiers).

In some such embodiments, the composition can also include various amounts of $C_{13-15}$ olefinic ester compounds, e.g., alkanol esters of 9,12-tridecadienoic acid, alkanol esters of 9,12-pentadecadienoic acid, and the like. In some embodiments, the composition includes up to 30 percent by weight, or up to 25 percent by weight, or up to 20 percent by weight, or up to 15 percent by weight, or up to 10 percent by weight, $C_{13}$ olefinic ester compounds (e.g., alkanol esters of 9,12-tridecanedienoic acid), based on the total weight of the composition or the total weight of the oily phase of an oil-in-water emulsion (excluding emulsifiers). In some embodiments, the composition includes up to 35 percent by weight, or up to 30 percent by weight, or up to 25 percent by weight, or up to 20 percent by weight, or up to 15 percent by weight, $C_{15}$ olefinic ester compounds (e.g., alkanol esters of 9,12-pentadecanedienoic acid), based on the total weight of the composition or the total weight of the oily phase of an oil-in-water emulsion (excluding emulsifiers).

In some such embodiments, the composition can also include an amount of olefin, e.g., alkenes. In some embodiments, the composition includes from 1 to 10 percent by weight, or from 1 to 7 percent by weight, alkenes, based on the total weight of the composition or the total weight of the oily phase of an oil-in-water emulsion (excluding emulsifiers). In some embodiments, the composition includes from 2 to 10 percent by weight, or from 2 to 7 percent by weight, alkenes, based on the total weight of the composition or the total weight of the oily phase of an oil-in-water emulsion (excluding emulsifiers). In some embodiments, the composition includes from 3 to 10 percent by weight, or from 3 to 7 percent by weight, alkenes, based on the total weight of the composition or the total weight of the oily phase of an oil-in-water emulsion (excluding emulsifiers).

In some other embodiments, higher amounts of saturated ester compounds can be included in the composition. For example, in some embodiments, the composition includes at least 30 percent by weight, or at least 40 percent by weight of saturated ester compounds, such as methyl palmitate, methyl stearate, methyl laurate, etc., based on the total weight of olefinic ester compounds and saturated ester compounds in the composition. In some such embodiments, the amounts of $C_{10-12}$ unsaturated ester compounds can be lower. For example, in some embodiments, the composition includes no more than 50 percent by weight, or no more than 40 percent by weight, or no more than 35 percent by weight of $C_{10-12}$ unsaturated ester compounds (e.g., methyl 9-decenoate and methyl 9-dodecenoate). In some embodiments, the composition includes: (a) 5 to 30 percent by weight, or 5 to 20 percent by weight of $C_{10}$ olefinic ester compounds (e.g., methyl esters of 9-decenoic acid); (b) 5 to 30 percent by weight, or 10 to 20 percent by weight of $C_{12}$ olefinic ester compounds (e.g., methyl esters of 9-dodecenoic acid); and (c) 30 to 70 percent by weight, or 40 to 60 percent by weight of saturated ester compounds (e.g., methyl palmitate).

In some other embodiments, the composition includes at least 20 percent by weight, or at least 30 percent by weight, or at least 40 percent by weight of terminal olefinic ester compounds, based on the total weight of olefinic ester compounds in the composition. In some other embodiments, the composition includes no more than 30 percent by weight, or no more than 40 percent by weight, or no more than 50 percent by weight of terminal olefinic ester compounds, based on the total weight of olefinic ester compounds in the composition.

In some embodiments, the composition can include at least 50% by weight, or at least 60% by weight, or at least 70% by weight, or at least 80% by weight, of $C_{10-12}$ unsaturated ester compounds (e.g., methyl 9-decenoate and methyl 9-dodecenoate), as well as a ketone, such as cyclohexanone, e.g., in an amount of up to 5% by weight, or up to 10% by weight, or up to 15% by weight, or up to 20% by weight, based on the total weight of the composition. Such compositions can also include, in some embodiments, other fatty acids, such as oleic acid. In some embodiments, the composition can also include certain petroleum distillates, such as mineral oil (100 SUS).

Derivation from Renewable Sources

The olefinic ester compounds employed in any of the aspects or embodiments disclosed herein can, in certain embodiments, be derived from renewable sources, such as from various natural oils or their derivatives. Any suitable methods can be used to make these compounds from such renewable sources. Suitable methods include, but are not limited to, fermentation, conversion by bioorganisms, and conversion by metathesis.

Olefin metathesis provides one possible means to convert certain natural oil feedstocks into olefins and esters that can be used in a variety of applications, or that can be further modified chemically and used in a variety of applications. In some embodiments, a composition (or components of a composition) may be formed from a renewable feedstock, such as a renewable feedstock formed through metathesis reactions of natural oils and/or their fatty acid or fatty ester derivatives. When compounds containing a carbon-carbon double bond undergo metathesis reactions in the presence of a metathesis catalyst, some or all of the original carbon-carbon double bonds are broken, and new carbon-carbon double bonds are formed. The products of such metathesis reactions include carbon-carbon double bonds in different locations, which can provide unsaturated organic compounds having useful chemical properties.

A wide range of natural oils, or derivatives thereof, can be used in such metathesis reactions. Examples of suitable natural oils include, but are not limited to, vegetable oils, algae oils, fish oils, animal fats, tall oils, derivatives of these oils, combinations of any of these oils, and the like. Representative non-limiting examples of vegetable oils include rapeseed oil (canola oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil feedstock comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil feedstock.

The natural oil may include canola or soybean oil, such as refined, bleached and deodorized soybean oil (i.e., RBD soybean oil). Soybean oil typically includes about 95 percent by weight (wt %) or greater (e.g., 99 wt % or greater) triglycerides of fatty acids. Major fatty acids in the polyol esters of soybean oil include but are not limited to saturated fatty acids such as palmitic acid (hexadecanoic acid) and stearic acid (octadecanoic acid), and unsaturated fatty acids such as oleic acid (9-octadecenoic acid), linoleic acid (9,12-octadecadienoic acid), and linolenic acid (9,12,15-octadecatrienoic acid).

Metathesized natural oils can also be used. Examples of metathesized natural oils include but are not limited to a metathesized vegetable oil, a metathesized algal oil, a metathesized animal fat, a metathesized tall oil, a metathesized derivatives of these oils, or mixtures thereof. For example, a metathesized vegetable oil may include metathesized canola oil, metathesized rapeseed oil, metathesized coconut oil, metathesized corn oil, metathesized cottonseed oil, metathesized olive oil, metathesized palm oil, metathesized peanut oil, metathesized safflower oil, metathesized sesame oil, metathesized soybean oil, metathesized sunflower oil, metathesized linseed oil, metathesized palm kernel oil, metathesized tung oil, metathesized jatropha oil, metathesized mustard oil, metathesized camelina oil, metathesized pennycress oil, metathesized castor oil, metathesized derivatives of these oils, or mixtures thereof. In another example, the metathesized natural oil may include a metathesized animal fat, such as metathesized lard, metathesized tallow, metathesized poultry fat, metathesized fish oil, metathesized derivatives of these oils, or mixtures thereof.

Such natural oils, or derivatives thereof, can contain esters, such as triglycerides, of various unsaturated fatty acids. The identity and concentration of such fatty acids varies depending on the oil source, and, in some cases, on the variety. In some embodiments, the natural oil comprises one or more esters of oleic acid, linoleic acid, linolenic acid, or any combination thereof. When such fatty acid esters are metathesized, new compounds are formed. For example, in embodiments where the metathesis uses certain short-chain olefins, e.g., ethylene, propylene, or 1-butene, and where the natural oil includes esters of oleic acid, an amount of 1-decene and 1-decenoid acid (or an ester thereof), among other products, are formed. Following transesterification, for example, with an alkyl alcohol, an amount of 9-denenoic acid alkyl ester is formed. In some such embodiments, a separation step may occur between the metathesis and the transesterification, where the alkenes are separated from the esters. In some other embodiments, transesterification can occur before metathesis, and the metathesis is performed on the transesterified product.

In some embodiments, the natural oil can be subjected to various pre-treatment processes, which can facilitate their utility for use in certain metathesis reactions. Useful pre-treatment methods are described in U.S. Patent Application Publication Nos. 2011/0113679, 2014/0275681, and 2014/0275595, all three of which are hereby incorporated by reference as though fully set forth herein.

In some embodiments, after any optional pre-treatment of the natural oil feedstock, the natural oil feedstock is reacted in the presence of a metathesis catalyst in a metathesis reactor. In some other embodiments, an unsaturated ester (e.g., an unsaturated glyceride, such as an unsaturated triglyceride) is reacted in the presence of a metathesis catalyst in a metathesis reactor. These unsaturated esters may be a component of a natural oil feedstock, or may be derived from other sources, e.g., from esters generated in earlier-performed metathesis reactions. In certain embodiments, in the presence of a metathesis catalyst, the natural oil or unsaturated ester can undergo a self-metathesis reaction with itself. In other embodiments, the natural oil or unsaturated ester undergoes a cross-metathesis reaction with the low-molecular-weight olefin or mid-weight olefin. The self-metathesis and/or cross-metathesis reactions form a metathesized product wherein the metathesized product comprises olefins and esters.

In some embodiments, the low-molecular-weight olefin (or short-chain olefin) is in the $C_{2-6}$ range. As a non-limiting example, in one embodiment, the low-molecular-weight olefin may comprise at least one of: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1,4-pentadiene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. In some embodiments, the short-chain olefin is 1-butene. In some instances, a higher-molecular-weight olefin can also be used.

In some embodiments, the metathesis comprises reacting a natural oil feedstock (or another unsaturated ester) in the presence of a metathesis catalyst. In some such embodiments, the metathesis comprises reacting one or more unsaturated glycerides (e.g., unsaturated triglycerides) in the natural oil feedstock in the presence of a metathesis catalyst. In some embodiments, the unsaturated glyceride comprises one or more esters of oleic acid, linoleic acid, linoleic acid, or combinations thereof. In some other embodiments, the unsaturated glyceride is the product of the partial hydrogenation and/or the metathesis of another unsaturated glyceride (as described above). In some such embodiments, the metathesis is a cross-metathesis of any of the aforementioned unsaturated triglyceride species with another olefin, e.g., an alkene. In some such embodiments, the alkene used in the cross-metathesis is a lower alkene, such as ethylene, propylene, 1-butene, 2-butene, etc. In some embodiments, the alkene is ethylene. In some other embodiments, the alkene is propylene. In some further embodiments, the alkene is 1-butene. And in some even further embodiments, the alkene is 2-butene.

Metathesis reactions can provide a variety of useful products, when employed in the methods disclosed herein. For example, the unsaturated esters may be derived from a natural oil feedstock, in addition to other valuable compositions. Moreover, in some embodiments, a number of valuable compositions can be targeted through the self-metathesis reaction of a natural oil feedstock, or the cross-metathesis reaction of the natural oil feedstock with a low-molecular-weight olefin or mid-weight olefin, in the presence of a metathesis catalyst. Such valuable compositions can include fuel compositions, detergents, surfactants, and other specialty chemicals. Additionally, transesterified products (i.e., the products formed from transesterifying an ester in the presence of an alcohol) may also be targeted, non-limiting examples of which include: fatty acid methyl esters ("FAMEs"); biodiesel; 9-decenoic acid ("9DA") esters, 9-undecenoic acid ("9UDA") esters, and/or 9-dodecenoic acid ("9DDA") esters; 9DA, 9UDA, and/or 9DDA; alkali metal salts and alkaline earth metal salts of 9DA, 9UDA, and/or 9DDA; dimers of the transesterified products; and mixtures thereof.

Further, in some embodiments, multiple metathesis reactions can also be employed. In some embodiments, the multiple metathesis reactions occur sequentially in the same reactor. For example, a glyceride containing linoleic acid can be metathesized with a terminal lower alkene (e.g., ethylene, propylene, 1-butene, and the like) to form 1,4-decadiene, which can be metathesized a second time with a terminal lower alkene to form 1,4-pentadiene. In other embodiments, however, the multiple metathesis reactions are not sequential, such that at least one other step (e.g., transesterification, hydrogenation, etc.) can be performed between the first metathesis step and the following metathesis step. These multiple metathesis procedures can be used to obtain products that may not be readily obtainable from a single metathesis reaction using available starting materials. For example, in some embodiments, multiple metathesis can involve self-metathesis followed by cross-metathesis to obtain metathesis dimers, trimmers, and the like. In some other embodiments, multiple metathesis can be used to obtain olefin and/or ester components that have chain lengths that may not be achievable from a single metathesis reaction with a natural oil triglyceride and typical lower alkenes (e.g., ethylene, propylene, 1-butene, 2-butene, and the like). Such multiple metathesis can be useful in an industrial-scale reactor, where it may be easier to perform multiple metathesis than to modify the reactor to use a different alkene.

The conditions for such metathesis reactions, and the reactor design, and suitable catalysts are as described above with reference to the metathesis of the olefin esters. That discussion is incorporated by reference as though fully set forth herein.

In the embodiments above, the natural oil (e.g., as a glyceride) is metathesized, followed by transesterification. In some other embodiments, transesterification can precede metathesis, such that the fatty acid esters subjected to metathesis are fatty acid esters of monohydric alcohols, such as methanol, ethanol, or isopropanol.

Olefin Metathesis

In some embodiments, one or more of the unsaturated monomers can be made by metathesizing a natural oil or natural oil derivative. The terms "metathesis" or "metathesizing" can refer to a variety of different reactions, including, but not limited to, cross-metathesis, self-metathesis, ring-opening metathesis, ring-opening metathesis polymerizations ("ROMP"), ring-closing metathesis ("RCM"), and acyclic diene metathesis ("ADMET"). Any suitable metathesis reaction can be used, depending on the desired product or product mixture.

In some embodiments, after any optional pre-treatment of the natural oil feedstock, the natural oil feedstock is reacted in the presence of a metathesis catalyst in a metathesis reactor. In some other embodiments, an unsaturated ester (e.g., an unsaturated glyceride, such as an unsaturated triglyceride) is reacted in the presence of a metathesis catalyst in a metathesis reactor. These unsaturated esters may be a component of a natural oil feedstock, or may be derived from other sources, e.g., from esters generated in earlier-performed metathesis reactions. In certain embodiments, in the presence of a metathesis catalyst, the natural oil or unsaturated ester can undergo a self-metathesis reaction with itself. In other embodiments, the natural oil or unsaturated ester undergoes a cross-metathesis reaction with the low-molecular-weight olefin or mid-weight olefin. The self-methathesis and/or cross-metathesis reactions form a metathesized product wherein the metathesized product comprises olefins and esters.

In some embodiments, the low-molecular-weight olefin is in the $C_{2-6}$ range. As a non-limiting example, in one embodiment, the low-molecular-weight olefin may comprise at least one of: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1,4-pentadiene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. In some instances, a higher-molecular-weight olefin can also be used.

In some embodiments, the metathesis comprises reacting a natural oil feedstock (or another unsaturated ester) in the presence of a metathesis catalyst. In some such embodiments, the metathesis comprises reacting one or more unsaturated glycerides (e.g., unsaturated triglycerides) in the natural oil feedstock in the presence of a metathesis catalyst. In some embodiments, the unsaturated glyceride comprises one or more esters of oleic acid, linoleic acid, linoleic acid, or combinations thereof. In some other embodiments, the unsaturated glyceride is the product of the partial hydrogenation and/or the metathesis of another unsaturated glyceride (as described above). In some such embodiments, the metathesis is a cross-metathesis of any of the aforementioned unsaturated triglyceride species with another olefin, e.g., an alkene. In some such embodiments, the alkene used in the cross-metathesis is a lower alkene, such as ethylene, propylene, 1-butene, 2-butene, etc. In some embodiments, the alkene is ethylene. In some other embodiments, the alkene is propylene. In some further embodiments, the alkene is 1-butene. And in some even further embodiments, the alkene is 2-butene.

Metathesis reactions can provide a variety of useful products, when employed in the methods disclosed herein. For example, terminal olefins and internal olefins may be derived from a natural oil feedstock, in addition to other valuable compositions. Moreover, in some embodiments, a number of valuable compositions can be targeted through the self-metathesis reaction of a natural oil feedstock, or the cross-metathesis reaction of the natural oil feedstock with a low-molecular-weight olefin or mid-weight olefin, in the presence of a metathesis catalyst. Such valuable compositions can include fuel compositions, detergents, surfactants, and other specialty chemicals. Additionally, transesterified products (i.e., the products formed from transesterifying an ester in the presence of an alcohol) may also be targeted, non-limiting examples of which include: fatty acid methyl esters ("FAMEs"); biodiesel; 9-decenoic acid ("9DA") esters, 9-undecenoic acid ("9UDA") esters, and/or 9-dodecenoic acid ("9DDA") esters; 9DA, 9UDA, and/or 9DDA; alkali metal salts and alkaline earth metal salts of 9DA, 9UDA, and/or 9DDA; dimers of the transesterified products; and mixtures thereof.

Further, in some embodiments, the methods disclosed herein can employ multiple metathesis reactions. In some embodiments, the multiple metathesis reactions occur sequentially in the same reactor. For example, a glyceride containing linoleic acid can be metathesized with a terminal lower alkene (e.g., ethylene, propylene, 1-butene, and the like) to form 1,4-decadiene, which can be metathesized a second time with a terminal lower alkene to form 1,4-pentadiene. In other embodiments, however, the multiple metathesis reactions are not sequential, such that at least one other step (e.g., transesterification, hydrogenation, etc.) can be performed between the first metathesis step and the following metathesis step. These multiple metathesis procedures can be used to obtain products that may not be readily obtainable from a single metathesis reaction using available starting materials. For example, in some embodiments, multiple metathesis can involve self-metathesis followed by cross-metathesis to obtain metathesis dimers, trimmers, and the like. In some other embodiments, multiple metathesis can be used to obtain olefin and/or ester components that have chain lengths that may not be achievable from a single metathesis reaction with a natural oil triglyceride and typical lower alkenes (e.g., ethylene, propylene, 1-butene, 2-butene, and the like). Such multiple metathesis can be useful in an industrial-scale reactor, where it may be easier to perform multiple metathesis than to modify the reactor to use a different alkene.

The metathesis process can be conducted under any conditions adequate to produce the desired metathesis products. For example, stoichiometry, atmosphere, solvent, temperature, and pressure can be selected by one skilled in the art to produce a desired product and to minimize undesirable byproducts. In some embodiments, the metathesis process may be conducted under an inert atmosphere. Similarly, in embodiments where a reagent is supplied as a gas, an inert gaseous diluent can be used in the gas stream. In such embodiments, the inert atmosphere or inert gaseous diluent typically is an inert gas, meaning that the gas does not interact with the metathesis catalyst to impede catalysis to a substantial degree. For example, non-limiting examples of inert gases include helium, neon, argon, and nitrogen, used individually or in with each other and other inert gases.

The rector design for the metathesis reaction can vary depending on a variety of factors, including, but not limited to, the scale of the reaction, the reaction conditions (heat, pressure, etc.), the identity of the catalyst, the identity of the materials being reacted in the reactor, and the nature of the feedstock being employed. Suitable reactors can be designed by those of skill in the art, depending on the relevant factors, and incorporated into a refining process such, such as those disclosed herein.

The metathesis reactions disclosed herein generally occur in the presence of one or more metathesis catalysts. Such methods can employ any suitable metathesis catalyst. The metathesis catalyst in this reaction may include any catalyst or catalyst system that catalyzes a metathesis reaction. Any known metathesis catalyst may be used, alone or in combination with one or more additional catalysts. Examples of metathesis catalysts and process conditions are described in US 2011/0160472, incorporated by reference herein in its entirety, except that in the event of any inconsistent disclosure or definition from the present specification, the disclosure or definition herein shall be deemed to prevail. A number of the metathesis catalysts described in US 2011/0160472 are presently available from Materia, Inc. (Pasadena, Calif.).

In some embodiments, the metathesis catalyst includes a Grubbs-type olefin metathesis catalyst and/or an entity derived therefrom. In some embodiments, the metathesis catalyst includes a first-generation Grubbs-type olefin metathesis catalyst and/or an entity derived therefrom. In some embodiments, the metathesis catalyst includes a second-generation Grubbs-type olefin metathesis catalyst and/or an entity derived therefrom. In some embodiments, the metathesis catalyst includes a first-generation Hoveyda- Grubbs-type olefin metathesis catalyst and/or an entity derived therefrom. In some embodiments, the metathesis catalyst includes a second-generation Hoveyda-Grubbs-type olefin metathesis catalyst and/or an entity derived therefrom. In some embodiments, the metathesis catalyst includes one or a plurality of the ruthenium carbene metathesis catalysts sold by Materia, Inc. of Pasadena, Calif. and/or one or more entities derived from such catalysts. Representative metathesis catalysts from Materia, Inc. for use in accordance with the present teachings include but are not limited to those sold under the following product numbers as well as combinations thereof: product no. C823 (CAS no. 172222-30-9), product no. C848 (CAS no. 246047-72-3), product no. C601 (CAS no. 203714-71-0), product no. C627 (CAS no. 301224-40-8), product no. C571 (CAS no. 927429-61-6), product no. C598 (CAS no. 802912-44-3), product no. C793 (CAS no. 927429-60-5), product no. C801 (CAS no. 194659-03-9), product no. C827 (CAS no. 253688-91-4), product no. C884 (CAS no. 900169-53-1), product no. C833 (CAS no. 1020085-61-3), product no. C859 (CAS no. 832146-68-6), product no. C711 (CAS no. 635679-24-2), product no. C933 (CAS no. 373640-75-6).

In some embodiments, the metathesis catalyst includes a molybdenum and/or tungsten carbene complex and/or an entity derived from such a complex. In some embodiments, the metathesis catalyst includes a Schrock-type olefin metathesis catalyst and/or an entity derived therefrom. In some embodiments, the metathesis catalyst includes a high-oxidation-state alkylidene complex of molybdenum and/or an entity derived therefrom. In some embodiments, the metathesis catalyst includes a high-oxidation-state alkylidene complex of tungsten and/or an entity derived therefrom. In some embodiments, the metathesis catalyst includes molybdenum (VI). In some embodiments, the metathesis catalyst includes tungsten (VI). In some embodiments, the metathesis catalyst includes a molybdenum- and/or a tungsten-containing alkylidene complex of a type described in one or more of (a) Angew. Chem. Int. Ed. Engl., 2003, 42, 4592-4633; (b) Chem. Rev., 2002, 102, 145-179; and/or (c) Chem. Rev., 2009, 109, 3211-3226, each of which is incorporated by reference herein in its entirety, except that in the event of any inconsistent disclosure or definition from the present specification, the disclosure or definition herein shall be deemed to prevail.

In certain embodiments, the metathesis catalyst is dissolved in a solvent prior to conducting the metathesis reaction. In certain such embodiments, the solvent chosen may be selected to be substantially inert with respect to the metathesis catalyst. For example, substantially inert solvents include, without limitation: aromatic hydrocarbons, such as benzene, toluene, xylenes, etc.; halogenated aromatic hydrocarbons, such as chlorobenzene and dichlorobenzene; aliphatic solvents, including pentane, hexane, heptane, cyclohexane, etc.; and chlorinated alkanes, such as dichloromethane, chloroform, dichloroethane, etc. In some embodiments, the solvent comprises toluene.

In other embodiments, the metathesis catalyst is not dissolved in a solvent prior to conducting the metathesis reaction. The catalyst, instead, for example, can be slurried with the natural oil or unsaturated ester, where the natural oil or unsaturated ester is in a liquid state. Under these conditions, it is possible to eliminate the solvent (e.g., toluene) from the process and eliminate downstream olefin losses when separating the solvent. In other embodiments, the metathesis catalyst may be added in solid state form (and not slurried) to the natural oil or unsaturated ester (e.g., as an auger feed).

The metathesis reaction temperature may, in some instances, be a rate-controlling variable where the temperature is selected to provide a desired product at an acceptable rate. In certain embodiments, the metathesis reaction temperature is greater than −40° C., or greater than −20° C., or greater than 0° C., or greater than 10° C. In certain embodiments, the metathesis reaction temperature is less than 200° C., or less than 150° C., or less than 120° C. In some embodiments, the metathesis reaction temperature is between 0° C. and 150° C., or is between 10° C. and 120° C.

The metathesis reaction can be run under any desired pressure. In some instances, it may be desirable to maintain a total pressure that is high enough to keep the cross-metathesis reagent in solution. Therefore, as the molecular weight of the cross-metathesis reagent increases, the lower pressure range typically decreases since the boiling point of the cross-metathesis reagent increases. The total pressure may be selected to be greater than 0.1 atm (10 kPa), or greater than 0.3 atm (30 kPa), or greater than 1 atm (100 kPa). In some embodiments, the reaction pressure is no more than about 70 atm (7000 kPa), or no more than about 30 atm (3000 kPa). In some embodiments, the pressure for the metathesis reaction ranges from about 1 atm (100 kPa) to about 30 atm (3000 kPa).

Cleaning Compositions and Methods of Use

In certain aspects, the disclosed compositions are cleaning compositions and can therefore be used for cleaning (e.g., cleaning surfaces, such as hard surfaces). In some embodiments, the disclosure provides methods for cleaning a surface, such as a hard surface, including contacting a surface (e.g., with an effective amount, or a cleaning-effective amount) with a composition according to any of the above embodiments.

The cleaning capability of the compositions is not limited to any particular type of surface, including both hard and porous surfaces. The compositions can be used effectively on a variety of surfaces, including, but not limited to, plastics, other polymeric materials, metals, wood, glass, ceramic, rock (e.g., granite, marble, etc.), and various synthetic countertop materials. Further, the compositions can be used effectively to remove a variety of different materials from the surface. The materials to be removed include, but are not limited to, chewing gum, undesired paint (e.g., graffiti), paint, grease (including lithium-based and molybdenum-based greases), oil, ink, fine particulate matter (e.g., coal dust), cooking oils or fats, cooking or baking residues, and any combinations thereof.

In some embodiments, an effective amount or a cleaning-effective amount of the composition is used. This amount can be determined readily based on the particular application, based on factors such as the nature of the surface, the nature of the material to be removed, the amount of the material to be removed, and the like.

Compositions and Methods of Use in Cleaning Food and Food-Related Materials

In certain aspects, the disclosed compositions are used for cleaning food and food-related materials. Such materials include, but are not limited to, fats and proteins, which can also include other carbonaceous material. In certain embodiments, the compositions are used for removing food or food-related products from surfaces (e.g., equipment surfaces) in a food-cooking or food-processing context. Such contexts include, but are not limited to, meat processing (e.g., slaughterhouses), vegetable oil processing, commercial ovens, exhaust hoods, countertops, and other like surfaces. In some embodiments, the disclosure provides methods for cleaning a food or food-related product from a surface, including contacting a surface (e.g., with an effective amount, or a cleaning-effective amount) with a composition according to any of the above embodiments.

The cleaning capability of the compositions is not limited to any particular type of surface, including both hard and porous surfaces. The compositions can be used effectively on a variety of surfaces, including, but not limited to, plastics, other polymeric materials, metals, wood, glass, ceramic, rock (e.g., granite, marble, etc.), and various synthetic countertop materials. Further, the compositions may be used effectively to remove a variety of different materials from the surface.

In some embodiments, an effective amount or a cleaning-effective amount of the composition is used. This amount can be determined readily based on the particular application, based on factors such as the nature of the surface, the nature of the material to be removed, the amount of the material to be removed, and the like.

Textile Treatment Compositions and Methods of Use

In certain aspects, the disclosed compositions are textile treatment compositions and can therefore be used for textiles, such as clothing, fabric, upholstered furniture, carpet, draperies and curtains, and the like. In some embodiments, the disclosure provides methods for treating a textile, including: applying an effective amount of the composition of any embodiment of the first aspect to a textile, e.g., on the surface. In some embodiments, the treating is a pretreating step, where the application of the treatment composition is used to enhance the effectiveness of a subsequent cleaning step. Such pretreatment can be suitably carried out on various types of stains.

The treating or pretreating capability of the compositions is not limited to any particular type of textile. The compositions can be suitable used on textiles formed from natural fibers (e.g., cotton, wool, linen, or blends thereof), synthetic fibers (e.g., polyester, nylon, rayon, elastane, acrylics, or blends thereof), or any blends of natural and synthetic fibers. Further, the compositions may be used effectively to remove a variety of different materials from the textiles. Such materials to be removed include, but are not limited to stains from: grass, dirt, peat, feces, blood, perspiration, other bodily fluids, dessert, fruits, vegetables, wine, fruit juices, coffee, tea, chocolate, animal fat, dyes, pigments, ink, crayons or other wax articles, clay, butter, grease, oil (e.g., motor oil), lipstick, makeup, herbs, mustard, mildew, and various combinations thereof.

In some embodiments, the textile treatment composition is used as a pretreatment composition. In some such embodiments, the textile is subsequently subjected to a wet cleaning (e.g., using a detergent) and/or a dry cleaning. Thus, in some embodiments, the disclosure provides methods of cleaning a textile article, comprising: contacting a surface of a textile article with the olefinic ester composition (e.g., as an effective amount or a cleaning-effective amount) according to any of the above embodiments. And in some other embodiments, the disclosure provides methods of pre-treating a textile article, comprising: contacting a surface of a textile article having a stain disposed thereon with the olefinic ester composition (e.g., as an effective amount or a treating-effective amount) according to any of the above embodiments.

In some embodiments, an effective amount or a treating-effective amount of the composition is used. This amount can be determined readily based on the particular application, based on factors such as the nature of the textile, the nature of the material to be removed, the amount of the material to be removed, and the like.

EXAMPLES

Example 1

Sample Preparation

Four compositions were prepared. Composition 1A included methyl 9-decenoate in its substantially pure form (>97 wt % pure). Composition 1B included methyl 9-dodecenoate in its substantially pure form (>97 wt % pure). Composition 1C included: 33.0 wt % methyl 9-decenoate; 46.9 wt % methyl 9-dodecenoate; 1.6 wt % $C_{13}$ olefinic methyl ester; 2.2 wt % methyl myristate; 4.1 wt % $C_{15}$ olefinic methyl ester; 8.0 wt % methyl palmitate; 1.2 wt % alkenes; and trace amounts of other ingredients. Composition 1D included: 11.9 wt % methyl 9-decenoate; 18.6 wt % methyl 9-dodecenoate; 1.7 wt % $C_{13}$ olefinic methyl ester; 0.1 wt % methyl myristate; 3.7 wt % $C_{15}$ olefinic methyl ester; 48.8 wt % methyl palmitate; 7.8 wt % methyl stearate; 5.3 wt % dimethyl 9-octadecenedioate; 1.2 wt % alkenes; and trace amounts of other ingredients. In instances where the samples contain more than one ingredient, the samples were mixed to ensure homogeneity.

Example 2

Solvency

Solvency power was determined by calculating kauri-butanol ($K_b$) values (ASTM D1133) for Compositions 1A-1D. The $K_b$ values were calculated according to ASTM D1133, which is incorporated herein by reference. A butanolic solution of kauri resin was titrated with each composition until the admixture reaches a certain turbidity. Higher values correlate with improved performance as a solvent. Table 1 shows the measured $K_b$ values for Compositions 1A-1D. $K_b$ values were also measured for certain other solvents as a basis of comparison.

TABLE 1

| Solvent | $K_b$ Value |
| --- | --- |
| Composition 1A | 98.5 |
| Composition 1B | 85.0 |
| Composition 1C | 81.5 |
| Composition 1D | 63.5 |
| Methyl Caprate | 96.1 |
| Methyl Laurate | 77.0 |
| Methyl Soyate | 59.3 |
| Methyl Caprylate/Caprate | 112.0 |

Example 3

Bitumen Removal

Bitumen is a composite mixture of relatively high-molecular-weight hydrocarbons, maltenes, and asphaltenes, all of which are present in crude oil. Bitumen is therefore a representative composition of certain deposits that may develop in oil wells, and that may need to be cleaned away by the use of certain solvents. Bitumen removal was measured according to ASTM D4488-95 A5, which is incorporated herein by reference, for each of the compositions as well as methyl soyate and d-limonene (as a comparison).

Bitumen removal was measured in terms of the number of Gardner scrub cycles necessary to achieve at least 80% removal. Lower values correlate with improved performance. Results are shown in Table 2.

TABLE 2

| Solvent | Gardner Scrub Cycles 80% Removal |
|---|---|
| Composition 1A | 55 |
| Composition 1B | 45 |
| Composition 1C | 60 |
| Composition 1D | 105 |
| Methyl Soyate | 175 |
| D-Limonene | 30 |

Example 4

Grease Removal

The compositions were tested for their ability to remove a thermally cured lithium complex grease from a stainless steel surface. A test protocol analogous to that used in Example 3 was employed. Grease removal was measured in terms of the number of Gardner scrub cycles necessary to achieve at least 80% removal. Lower values correlate with improved performance. Results are shown in Table 3.

TABLE 3

| Solvent | Gardner Scrub Cycles 80% Removal |
|---|---|
| Composition 1A | 29 |
| Composition 1B | 39 |
| Composition 1C | 42 |
| Composition 1D | 101 |
| Methyl Soyate | 184 |
| D-Limonene | 115 |

Example 5

Diluted Formulations

Various formulations were made using the composition of Composition 1B. Table 4 shows the makeup of various compositions (in percent by weight). In many instances, the compositions are designed to be diluted with an aqueous medium (e.g., water) to form an oil-in-water emulsion; therefore various emulsifiers have been included. According to the nomenclature of this disclosure, such emulsifiers are generally not considered to be part of the base composition, e.g., the oily phase of an oil-in-water emulsion. Rather, the emulsifiers are treated as being part of the aqueous phase, even though they may be at least partially miscible in the oily phase. Thus, the examples below illustrate various ways in which the compositions can be diluted with emulsifiers. The emulsifier content of such diluted compositions can vary. In some embodiments, the emulsifier can be present in an amount of from 5 to 75 percent by weight, or from 5 to 70 percent by weight, or from 5 to 65 percent by weight, or from 5 to 60 percent by weight, or from 5 to 55 percent by weight, or from 5 to 50 percent by weight, based on the total weight of the oily material (e.g., ester and olefin) and the emulsifier. These compositions can be diluted with any suitable amount of water. In some embodiments, the weight-to-weight ratio of the compositions shown below to water can vary from 20:1 to 1:500, or from 10:1 to 200:1, or from 5:1 to 100:1, depending on the desired end-use application of the emulsified composition.

It should also be noted, the compositions identified as Composition 1B may, in certain optional embodiments, include some small amount of deodorizer. The compositions are described as 2A to 2O.

TABLE 4

| Ingredient | 2A | 2B | 2C | 2D | 2E | 2F | 2G | 2H | 2I | 2J | 2K | 2L | 2M | 2N | 2O |
|---|---|---|---|---|---|---|---|---|---|---|---|---|---|---|---|
| Composition 1B | 35 | 33 | 15 | 38 | 32 | 69 | 25 | 36 | 60 | 34 | 15 | 47 | 77 | 43 | 44 |
| TOMADOL 1-5 | 41 | — | — | — | — | — | — | — | — | — | — | — | — | — | — |
| TOMADOL 1-7 | — | — | — | 14 | — | — | — | — | — | — | — | — | — | — | — |
| TOMADOL 1-9 | — | — | — | — | — | — | — | 9 | — | — | — | — | — | — | — |
| TOMADOL 91-6 | — | — | — | 38 | — | — | — | — | — | — | 40 | — | — | 46 | 27 |
| TOMADOL 91-8 | — | — | — | — | 24 | — | — | — | — | 7 | — | — | — | — | — |
| TOMADOL 91-2.5 | — | — | — | — | — | 7 | — | — | 4 | — | — | — | 5 | 11 | 7 |
| TOMADOL 23-5 | — | — | — | — | — | — | — | — | — | — | — | — | 18 | — | — |
| LUTENSOL XP89 | 11 | 12 | — | — | 14 | — | 7 | — | — | — | — | — | — | — | — |
| AEROSOL OT-75-PG | — | 49 | — | — | — | — | — | — | — | — | — | — | — | — | — |
| AEROSOL OT-70-PG | — | — | — | — | 45 | — | — | — | — | — | — | — | — | — | — |
| BIOSOFT N1-9 | — | — | 35 | — | — | — | 30 | — | — | — | — | — | — | — | — |
| BIOSOFT N1-5 | — | — | — | — | — | — | — | — | — | — | 34 | — | — | — | — |
| STEPANOL AM | — | — | 50 | — | — | — | — | — | — | — | — | — | — | — | — |
| STEPANATE SXS | — | — | — | — | — | 25 | — | — | — | — | — | — | — | — | — |
| SXS (40%) | — | — | — | — | — | — | — | — | — | — | — | 38 | — | — | — |
| STEPOSOL MET-10U | — | — | — | — | — | — | — | 36 | — | — | — | — | — | — | — |
| NINOL 40-CO | — | — | — | — | — | — | 18 | — | — | — | — | — | — | — | — |
| MAKON 8 | — | — | — | — | — | — | — | — | 36 | — | — | — | — | — | — |
| CALIMULSE PRS | — | — | — | — | — | — | — | — | — | — | — | 32 | — | — | — |
| AG 6206 | 13 | — | — | — | — | — | — | — | — | — | — | — | — | — | — |
| DOWANOL DPM | — | 6 | — | — | — | — | — | — | — | — | — | — | — | — | — |
| DOWANOL PM | — | — | — | 9 | — | — | — | — | — | — | — | 11 | — | — | — |
| BIO-TERGE PAS-8S | — | — | — | 10 | — | — | — | 1 | — | — | — | — | — | — | — |

TABLE 4-continued

| Ingredient | 2A | 2B | 2C | 2D | 2E | 2F | 2G | 2H | 2I | 2J | 2K | 2L | 2M | 2N | 2O |
|---|---|---|---|---|---|---|---|---|---|---|---|---|---|---|---|
| BEROL 563 MC | — | — | — | — | — | — | 12 | — | — | — | — | — | — | — | — |
| Sodium Citrate | — | — | — | — | — | — | 1 | — | — | — | — | — | — | — | — |
| Oleic Acid | — | — | — | — | — | — | — | — | — | — | — | 28 | — | — | — |
| Triisopropylamine | — | — | — | — | — | — | — | — | — | — | — | 14 | — | — | — |
| DPGPE | — | — | — | — | — | — | — | — | — | — | — | — | — | — | 22 |

TOMADOL products are supplied by Air Products, Inc., Allentown, Pennsylvania, USA.
LUTENSOL products are supplied by BASF, Leverkusen, Germany.
AG 6206 is supplied by AkzoNobel, Amsterdam, Netherlands.
BEROL products are supplied by AkzoNobel, Amsterdam, Netherlands.
AEROSOL products are supplied by Cytec Industries, Inc., West Patterson, New Jersey, USA.
DOWANOL products are supplied by the Dow Chemical Company, Midland, Michigan, USA.
BIOSOFT products are supplied by Stepan Co., Northfield, Illinois, USA.
STEPANATE products are supplied by Stepan Co., Northfield, Illinois, USA.
STEPANOL products are supplied by Stepan Co., Northfield, Illinois, USA.
STEPOSOL products are supplied by Stepan Co., Northfield, Illinois, USA.
BIO-TERGE products are supplied by Stepan Co., Northfield, Illinois, USA.
NINOL products are supplied by Stepan Co., Northfield, Illinois, USA.
MAKON products are supplied by Stepan Co., Northfield, Illinois, USA.
CALIMULSE products are supplied by Pilot Chemical Co., Cincinnati, Ohio, USA.
SXS = Sodium Xylenesulfonate.
DPGPE = Dipropylene glycol propyl ether.

Example 6

Textile Pretreatment Compositions

Various textile pretreatment formulations were made using the composition of Composition 1B. Table 5 shows the makeup of various compositions (in percent by weight). It should also be noted, the compositions identified as Composition 1B may, in certain optional embodiments, include some small amount of deodorizer. The compositions are described as 3A and 3B.

TABLE 5

| Ingredient | 3A | 3B |
|---|---|---|
| Composition 1B | 56 | 20 |
| BIO-SOFT 25-3 | 19 | — |
| BIO-SOFT 25-7 | 19 | 10 |
| DOWANOL DPM | 4 | 6 |
| DDBSA Sodium Salt | — | 10 |
| Water | 2 | 54 |

DOWANOL products are supplied by the Dow Chemical Company, Midland, Michigan, USA.
BIO-SOFT products are supplied by Stepan Co., Northfield, Illinois, USA.
DDBSA = Dodecyl benzene sulfonic acid.

Example 7

Food Product Removal Compositions

Various food product removal formulations were made using the composition of Composition 1B. Such compositions can be useful for cleaning slaughterhouse equipment, fry vats, exhaust hoods, and the like. Table 6 shows the makeup of various compositions (in percent by weight). It should also be noted, the compositions identified as Composition 1B may, in certain optional embodiments, include some small amount of deodorizer. The compositions are described as 4A to 4F.

TABLE 6

| Ingredient | 4A | 4B | 4C | 4D | 4E | 4F |
|---|---|---|---|---|---|---|
| Composition 1B | 43.2 | 27.8 | 27.6 | 27.0 | 24.4 | 24.3 |
| AMMONYX LO (30%) | — | 27.8 | 27.6 | 27.0 | 24.4 | 24.3 |
| BIOSOFT N25-7 | 21.6 | 27.8 | 27.6 | 27.0 | — | — |
| BIOSOFT N91-8 | — | — | — | — | 36.6 | 36.6 |
| BIOSOFT N411 | — | — | — | 2.8 | — | — |
| DOWANOL DPM | — | 5.5 | 5.5 | 5.4 | 4.9 | 4.9 |
| Propylene glycol | — | 11.1 | 11.1 | 10.8 | 9.7 | 9.7 |
| EDTA disodium salt | 0.6 | — | 0.6 | — | — | 0.2 |
| DDBSA sodium salt | 21.6 | — | — | — | — | — |
| Sodium Xylene Sulfonate | 13.0 | — | — | — | — | — |

EDTA = Ethylenediaminetetraacetic acid
Sodium xylene sulfonate is in 40% aqueous solution
DDBSA = Dodecylbenzene sulfonic acid
DOWANOL products are supplied by The Dow Chemical Co., Midland, Michigan, USA.
DOWANOL DPM is a glycol ether-based composition.
BIOSOFT products are supplied by Stepan Co., Northfield, Illinois, USA.
AMMONYX products are supplied by Stepan Co., Northfield, Illinois, USA.

Example 8

Laundry Pre-Washing

A laundry pre-wash formulation was made, which contained 20 wt % Composition 1B, 10 wt % BIO-SOFT N25-7, 10 wt % sodium dodecylbenzenesulfonate, 8 wt % STEPANATE SXS, and the remaining amount of water. Stain removal from cotton fabric (EMPA 102) was tested according to American Society for the Testing of Materials (ASTM) Test No. D4265-98 for removal stains of the following materials: makeup, curry, red wine, pasta sauce, blood, dessert, beta-carotene, grass, animal fats and dye, clay, butter, and engine oil. The effectiveness of the test solution was evaluated against formulations that used other ingredients in place of Composition 1B: d-limonene (Comp 1), methyl soyate (Comp 2), dibasic esters (Comp 3), and mineral spirits (Comp 4). Table 7 reports the percentage stain removal for each solution on each material.

TABLE 7

| Stain | Test Soln | Comp 1 | Comp 2 | Comp 3 | Comp 4 |
|---|---|---|---|---|---|
| Makeup | 15 | 13 | 13 | 14 | 15 |
| Curry | 36 | 12 | 12 | 18 | 23 |

TABLE 7-continued

| Stain | Test Soln | Comp 1 | Comp 2 | Comp 3 | Comp 4 |
|---|---|---|---|---|---|
| Red Wine | 37 | 30 | 39 | 32 | 33 |
| Pasta Sauce | 64 | 36 | 42 | 47 | 55 |
| Blood | 82 | 83 | 82 | 84 | 86 |
| Dessert | 60 | 60 | 57 | 61 | 67 |
| Beta-carotene | 75 | 29 | 31 | 11 | 31 |
| Grass | 49 | 36 | 34 | 46 | 32 |
| Animal Fat & Dye | 44 | 34 | 59 | 38 | 40 |
| Clay | 32 | 22 | 25 | 29 | 24 |
| Butter | 74 | 67 | 67 | 65 | 70 |
| Engine Oil | 42 | 43 | 40 | 45 | 44 |

Example 9

Laundry Pre-Spotting

A laundry pre-wash formulation was made, which contained 56 wt % Composition 1B, 19 wt % BIO-SOFT N25-3, 19 wt % BIO-SOFT N25-7, 4 wt % DOWANOL DPM, and 2 wt % water. Stain removal from cotton fabric (EMPA 102) was tested according to ASTM Test No. D4265-98 for removal stains of the following materials: blood, dessert, peat, beta-carotene, grass, animal fats and dye, clay, butter, and engine oil. The effectiveness of the test solution was evaluated against formulations that used other ingredients in place of Composition 1B: d-limonene (Comp 5), methyl soyate (Comp 6), dibasic esters (Comp 7), and mineral spirits (Comp 8). Table 8 reports the percentage stain removal for each solution on each material.

TABLE 8

| Stain | Test Soln | Comp 5 | Comp 6 | Comp 7 | Comp 8 |
|---|---|---|---|---|---|
| Blood | 69 | 39 | 66 | 45 | 67 |
| Dessert | 50 | 46 | 46 | 49 | 53 |
| Peat | 34 | 9 | 35 | 34 | 31 |
| Beta-carotene | 55 | 52 | 40 | 42 | — |
| Grass | 55 | 43 | 28 | 41 | 38 |
| Animal Fat & Dye | 95 | 77 | 56 | 64 | 64 |
| Clay | 26 | 8 | 17 | 17 | 41 |
| Butter | 78 | 76 | 75 | 80 | 75 |
| Engine Oil | 76 | 57 | 69 | 39 | 74 |

What is claimed is:

1. A method for cleaning a surface, comprising:
contacting a surface with a composition, the composition comprising water and olefinic ester compounds, wherein the olefinic ester compounds are $C_{1-6}$ alkanol esters of 9-dodecenoic acid, and wherein the olefinic ester compounds make up from 1 to 70 percent by weight of the composition, based on the total weight of the composition.

2. The method of claim 1, wherein the olefinic ester compounds make up from 1 to 50 percent by weight of the composition, based on the total weight of the composition.

3. The method of claim 1, further comprising a carrier, an additional solvent, a co-solvent, a surfactant, a co-surfactant, an emulsifier, a natural or synthetic colorant, a natural or synthetic fragrance, an antioxidant, a corrosion inhibitor, or an antimicrobial agent.

4. The method of claim 1, further comprising a surfactant.

5. The method of claim 4, wherein the surfactant is selected from the group consisting of an anionic surfactant, a cationic surfactant, a non-ionic surfactant, and combinations thereof.

6. The method of claim 1, wherein the composition is an emulsion.

7. The method of claim 1, wherein the olefinic ester compounds are methyl, ethyl, or isopropyl esters of 9-dodecenoic acid.

8. The method of claim 7, wherein the olefinic ester compounds are methyl 9-dodecenoate.

\* \* \* \* \*